United States Patent [19]

Edstrom

[11] 4,199,000

[45] Apr. 22, 1980

[54] CROSS-CONTAMINATION ISOLATOR

[76] Inventor: William E. Edstrom, 28324 E. Main, Waterford, Wis. 53185

[21] Appl. No.: 925,918

[22] Filed: Jul. 19, 1978

[51] Int. Cl.$^2$ .......................... A01K 7/00; A01K 7/06
[52] U.S. Cl. .................................. 137/206; 119/72.5; 119/75; 137/454; 137/614.2
[58] Field of Search ............... 119/72.5, 72, 75, 78; 128/214 C, 227; 138/42, 43; 137/454, 614.2, 206, 247.11, 247.41, 209

[56] References Cited

U.S. PATENT DOCUMENTS

| | | | |
|---|---|---|---|
| 2,115,499 | 4/1938 | Salvoni | 137/614.2 X |
| 2,999,499 | 9/1961 | Willet | 128/214 R |
| 3,228,377 | 1/1966 | Grassano | 119/72.5 |
| 3,476,088 | 11/1969 | Smith | 119/72.5 |
| 3,563,264 | 2/1971 | Boegli | 137/209 |
| 3,993,066 | 11/1976 | Virag | 128/214 C |
| 4,136,692 | 1/1979 | Goldowsky | 128/214 C |

*Primary Examiner*—Hugh R. Chamblee
*Attorney, Agent, or Firm*—Joseph P. House, Jr.

[57] ABSTRACT

A liquid isolator to prevent cross-contamination in the supply of liquid to and between animal racks. The isolator comprises cylindrical concentric tubes arranged to form a liquid storage chamber, a standpipe in the chamber, and a liquid entry tube within the standpipe. Near their upper ends, a liquid transfer port is provided between the standpipe chamber and the liquid storage chamber. An air lock is formed between the liquid transfer port and the level of any liquid in the storage chamber. The air lock isolates liquid in the standpipe chamber from the liquid in the storage chamber. Check valves are also provided in a liquid inlet at the top of the isolator and a liquid outlet at the bottom of the isolator, thus to prevent back flow through the isolator.

5 Claims, 6 Drawing Figures

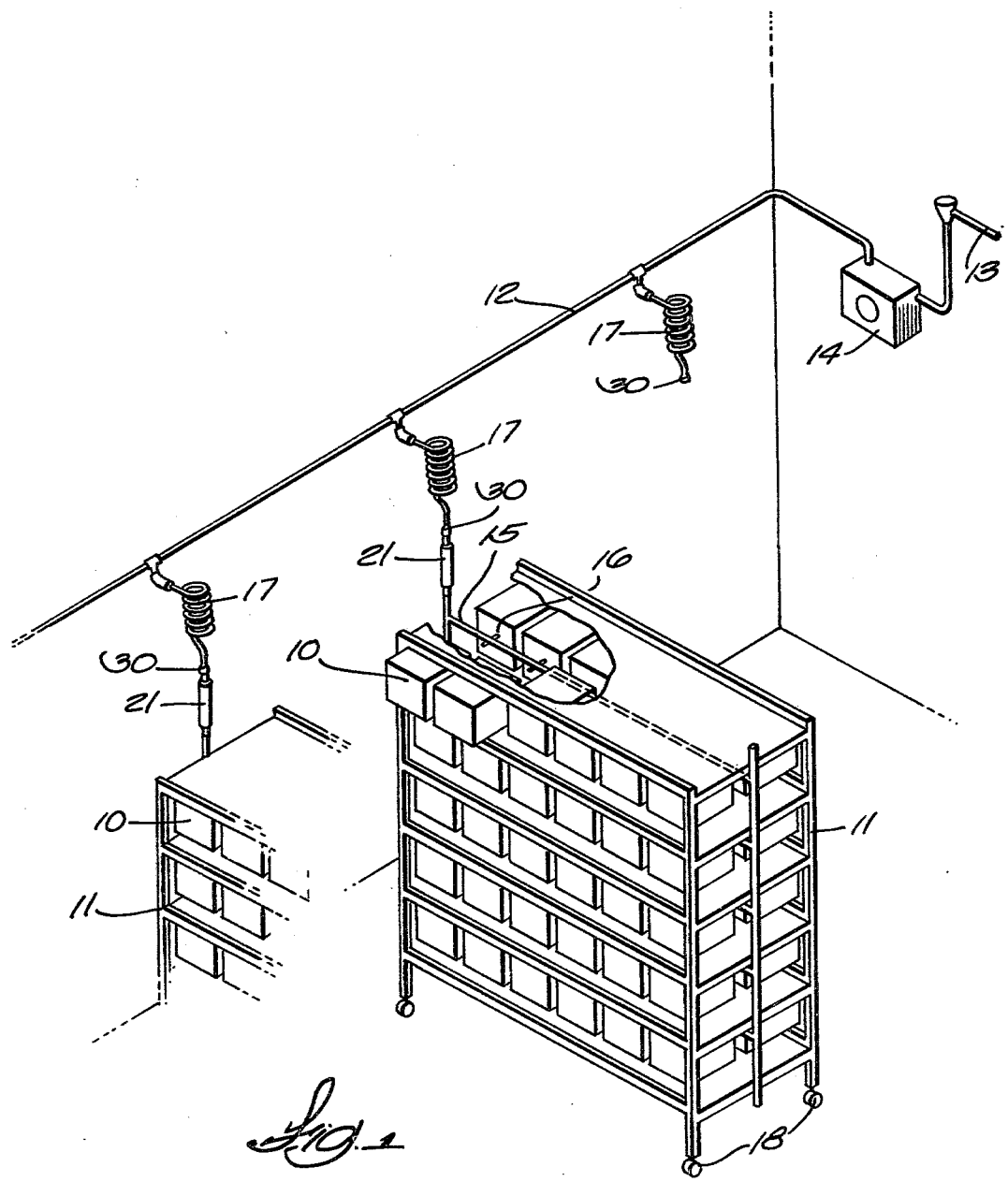

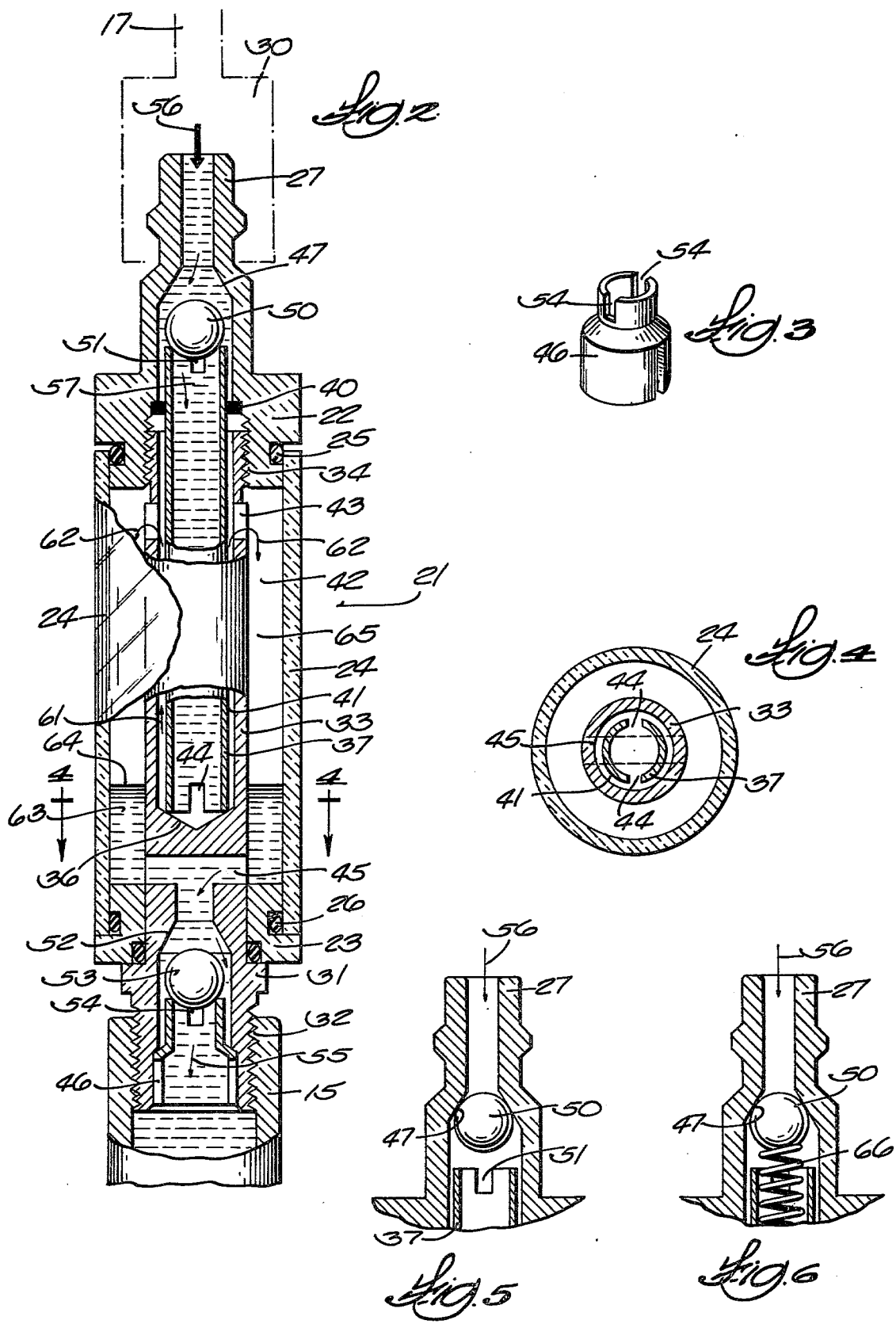

CROSS-CONTAMINATION ISOLATOR

BACKGROUND OF THE INVENTION

U.S. Pat. to Smith No. 3,476,088 of Nov. 4, 1969, shows a cross-contamination prevention device for animal cages. The isolator of the present invention is an improvement thereover, both in its construction and in its operation. The prior device is expensive to fabricate and does not prevent back flow. In the event of sudden loss of pressure or development of suction at its inlet, the air in the storage chamber of the prior device could be sucked back into the standpipe and draw with it liquid from the storage reservoir to contaminate the liquid supply source and other animal cages.

SUMMARY OF THE INVENTION

In accordance with the present invention, the isolator structure is made inexpensively because all of the liquid and air chambers are formed by concentric tubes which are easily fabricated and easily assembled. Accordingly, there is no need for any bulky body castings or other parts requiring expensive fabrication.

The liquid passage into the standpipe is unique in that it is made through an entry tube which is coaxial with the standpipe and discharges at the bottom of the standpipe even though it receives liquid from a liquid inlet at the top of the isolator. Accordingly, the liquid inlet can be at the top of an upright cylindrical isolator, the outlet can be at the bottom, and both are coaxial with the standpipe and the storage chamber.

A check valve is provided in the liquid inlet to preclude any back flow of liquid from the storage chamber back to the liquid source. The outlet is also provided with a check valve to prevent any back flow of liquid from the isolator outlet into the storage chamber.

U.S. Pat. No. 2,115,499 to Salvoni of Apr. 26, 1938, shows check valves, but these are not disposed coaxially with a standpipe and storage chamber in the inexpensive and effective structure of the present invention.

Other objects, features, and advantages of the invention will appear from the disclosure hereof.

DESCRIPTION OF THE DRAWINGS

FIG. 1 is a diagrammatic perspective view of animal cage racks and a room distribution liquid manifold which supplies liquid to the animals in the respective cages in each rack.

FIG. 2 is a vertical cross section taken through an isolator which intervenes between each rack and the liquid supply system.

FIG. 3 is a perspective view of the bottom plug for the isolator outlet.

FIG. 4 is a cross section taken along the line 4—4 of FIG. 2.

FIG. 5 is a fragmentary cross section through the inlet portion of the isolator and showing the ball check valve moved into its closed position.

FIG. 6 is a cross section similar to FIG. 5, but showing a modified embodiment in which a spring assists movement of the ball check valve into its closed position.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Research facilities such as pharmaceutical companies, medical colleges, hospitals, and testing laboratories maintain large colonies of animals for the performance of their research and testing work. This activity can require hundreds or thousands of cages for housing the laboratory animals. The animals typically include such animals as rats, mice, rabbits, dogs, monkeys, etc.

The cages 10 are typically arranged as shown in FIG. 1 in movable racks 11, each rack containing a large number of these cages. In order to supply liquid such as water to the animals automatically, a typical watering system will consist of a room distribution manifold pipe 12 which receives liquid from a source 13 through a pressure reducer 14.

Each rack 11 contains a rack liquid manifold pipe system 15 which distributes liquid to animal activated drinking valves 16, one in each cage. When the animal activates his drinking valve, liquid from room manifold 12 will flow into the rack manifold 15 to supply such liquid.

In a large installation, there can be as many as fifty animal racks serviced by a single room distribution manifold 12.

Heretofore, each rack liquid manifold 15 has been directly connected to the room liquid manifold 12 through a flexible self-storing recoil hose 17. When a rack 11 is to be moved to a different part of the building for research or cleaning purposes, a coupling between hose 17 and the rack manifold is disconnected and the rack is transported on its wheels 18. When an animal rack is returned to the room, typically with its rack liquid manifold nearly empty, and is reconnected to the room distribution manifold 12, a pressure drop in the room manifold 12 will occur while the rack manifold is being filled with liquid. If the pressure in the manifold 12 drops below the pressure in the rack manifolds 15 of the other racks, there may be a back flow of liquid from the rack manifolds 15 of the other racks back into the room manifold 12. In the event the liquid in such other rack manifolds is contaminated, this contaminated liquid can travel through the room manifold 12 into the other rack manifolds to result in cross contamination between the several racks. Over a period of time with many rack connections being made and broken and flow of contaminated liquid from one rack to the other, infectious diseases can be transmitted from one group of animals to another and seriously jeopardize the research program.

In accordance with the present invention, a rack isolator 21 is interposed between each rack manifold 15 and its recoil hose 17. The rack isolator 21 will isolate the liquid in the room manifold from the liquid in the rack manifold and will prevent any back flow of liquid from the rack manifold 15 into the room manifold 12. Each rack isolator 21 contains air gap or air lock in the liquid circuit or path so that transmission of contamination across the air gap or lock is precluded. Moreover, each isolator is provided with check valves to prevent back flow or siphoning of the liquid from the rack manifolds back to the room manifold under conditions where inlet pressure drops below outlet pressure.

The rack isolator 21 as shown in FIG. 2 is inexpensively fabricated of a series of concentric coaxial tubes which are assembled in telescopic relationship. The rack isolator comprises an upper end cap 22 and a lower end cap 23 which are spaced apart vertically and are connected by an upright transparent cylindrical tubular body 24. Suitable O-rings 25, 26 seal the joints between the tube 24 and the upper and lower caps 22, 23.

Upper cap 22 is provided with a liquid inlet coupling 27 which is adapted to detachably interconnect with a complementary coupling 30 at the end of the recoil hose 17. The lower cap 23 is provided with an axially extending liquid outlet 31 sealed to cap 23 by O-ring 29. Outlet 31 is adapted to couple with the rack manifold pipe 15 through the detachable threaded connection 32 therebetween.

Concentrically within the body tube 24 is a standpipe 33 which has its upper end secured to the upper cap 22 through the threaded connection 34. There is a space between concentric tubes 24, 33 providing an annular cross section storage chamber 42. At its lower end, standpipe 33 has base means including a downwardly tapered sheet 36 for supporting and centering the lower end of liquid entry tube 37 which has its bottom end engaged with the seat 36. The upper end of entry tube 37 is centered in cap 22 by O-ring 40. Entry tube 37 has a diameter less than the diameter of the standpipe 33, thus to provide an annular standpipe chamber 41 therebetween.

Near its upper end, but within the storage chamber 42, standpipe 33 is provided with one or more transfer ports 43 through which liquid in the standpipe chamber 41 can spill over into the chamber 42. Entry tube 37 is provided with cross slots 44 at its lower end to communicate between the bottom end of the entry tube 37 and the standpipe chamber 41.

Below the standpipe 33 there is a cross channel 45 which communicates between the storage chamber 42 and the isolator outlet 31 and through a ball check valve support plug 46 into the rack manifold pipe 15.

Isolator inlet 27 is provided with a downwardly flared beveled seat 47 for a ball check valve 50. Flow of liquid into the isolator as shown by flow arrow 56 normally opens ball valve 50 and pushes ball 50 against the upper end of the inlet tube 37 which has cross slots 51 to admit liquid from the inlet 27 into the entry tube 37 notwithstanding the ball 50 closing the top of the entry tube 37.

Isolator outlet 31 is also provided with a downwardly flared beveled seat 52 for ball check valve 53. Flow of liquid on the path 55 normally urges the ball 53 against the upper end of the plug 46. The upper end of plug 46 is provided with cross slots 54 to allow flow of liquid in the direction of arrow 55 around the ball 53 and through the slots 54 as shown in FIG. 2, thus to supply liquid to the manifold pipe 15. Balls 50, 53 are desirably of lower specific gravity than the liquid. Accordingly, in the absence of flow in the direction of arrows 56, 55, balls 50, 53 will float to seal against seats 47, 52 and prevent back flow of liquid.

In operation, when an empty rack manifold 15 is first connected to the room manifold 12 through the rack isolator 21, the pressure of liquid in the room manifold 12, typically about 3 psi, will cause this liquid to flow into the rack isolator through its inlet 27 in the direction of arrow 56. This flow will open check valve 50 and will flow around the ball 50 on the path indicated by arrow 57 into the entry tube 37 and to the bottom of the entry tube 37 where it flows through the cross slots 44 into the annular cross section standpipe chamber 41 from whence it flows upwardly as indicated by the arrow path 61 to the level of the transfer ports 43 where it spills over into the storage chamber 42 along the path indicated by arrows 62.

This liquid will free-fall through the air trapped in chamber 42 an will collect in the bottom of the storage chamber 42 as indicated at 63. Liquid 63 will reach some level, for example, the level 64 indicated in FIG. 2. Lever 64 is established when the liquid pressure in the rack manifold 15 equals the pressure in the room manifold 12. The rising level of liquid in storage chamber 42 compresses the air trapped in storage chamber 42 until this air is at the same pressure of the liquid in the entire system. This results in a positive air gap or air lock 65 between the water level 64 and the entrance liquid in standpipe 33 at transfer ports 43.

When the pressure of liquid in the rack manifold 15 is reduced as a result of an animal opening his drinking valve, liquid will flow through transfer ports 43 and spill through the air gap 65 to the rack manifold 15. Accordingly, the air lock 65 isolates the liquid in the rack manifold 15 from the liquid in the room distribution manifold 12 and prevents cross-contamination therebetween.

If pressure of the liquid in the room distribution manifold 12 drops below the pressure of the liquid in the rack manifold 15, for example, when one or more empty racks are connected to the room manifold 12, thus to impose a sudden drain on the room manifold 12, the pressure of the liquid in the rack manifold 15 may become higher than the pressure in the room manifold 12 and tend to force the liquid level 64 up to back flow through the isolator, notwithstanding the air lock 65. However, ball check valves 50, 53 will close against their seats 47, 52, as illustrated in FIG. 5. Accordingly, the ball check valve 50 will prevent any flow of liquid from the isolator back into the room manifold 12, and check valve 53 will seat against its seat 52 to prevent back flow of liquid from the room manifold 15 into the storage chamber 42.

FIG. 6 shows a modification in which ball check valve 50 is assisted by a light spring 66. Such a spring would be necessary if the material of the ball check valve 50 had a higher specific gravity than the liquid, thus to maintain the check valve closed except when subject to pressure of incoming liquid indicated by arrow 56. A similar light spring can be used to assist closing of ball valve 53, if desired.

I claim:

1. A liquid isolator to prevent crosscontimination in the supply of liquid to and between animal racks and the like, said isolator comprising an upright cylindrical tubular body having a liquid inlet at its top and a liquid outlet at its bottom, a coaxial standpipe within the tubular body and of smaller diameter than the body, said body and standpipe forming an annular cross section liquid storage chamber therebetween, a liquid entry tube within the standpipe and of smaller diameter than the standpipe to form with the standpipe an annular cross section standpipe chamber therebetween, said standpipe having base means on which the entry tube is supported, a liquid entry port at the upper end of the entry tube communicating with said liquid inlet and a liquid exit port near the lower end of the entry tube communicating with said standpipe chamber, transfer port means between the standpipe chamber and liquid storage chamber near the upper ends thereof, transfer port means between the storage chamber and the said liquid outlet near the lower end of the storage chamber, the portion of said storage chamber between the transfer port means at the upper end of the storage chamber and the level of any liquid in said chamber constituting an air lock to isolate liquid in the standpipe chamber from the liquid in the storage chamber.

2. The isolator of claim 1 in combination with check valve means in said liquid inlet for prevent back flow of liquid from the entry tube into the liquid inlet.

3. The isolator of claim 1 in combination with check valve means in said liquid outlet for preventing back flow of liquid from the said liquid outlet into said storage chamber.

4. The isolator of claims 2 or 3 in which the check valve means comprises a ball valve of lower specific gravity than the liquid, whereby to be lifted by said liquid into closed position.

5. The isolator of claims 2 or 3 in which the check valve means comprises a ball valve and a spring biasing the ball valve toward closed position.